(12) United States Patent
Polewarczyk et al.

(10) Patent No.: US 8,747,015 B1
(45) Date of Patent: Jun. 10, 2014

(54) HEMISPHERICAL JOINT FOR COMPOSITE MATERIAL JOINING

(71) Applicant: GM Global Technology Operations LLC, Detroit, MI (US)

(72) Inventors: Joseph M. Polewarczyk, Rochester Hills, MI (US); Stewart Thomas Darren Edmison, Oshawa (CA); David C. Cochrane, Oshawa (CA); Dirk R. Lungershausen, Wiesbaden (DE)

(73) Assignee: GM Global Technology Operations, Detroit, MI (US)

( * ) Notice: Subject to any disclaimer, the term of this patent is extended or adjusted under 35 U.S.C. 154(b) by 9 days.

(21) Appl. No.: 13/767,912

(22) Filed: Feb. 15, 2013

(51) Int. Cl.
*B25G 3/26* (2006.01)
(52) U.S. Cl.
USPC .......................................... 403/384; 411/537
(58) Field of Classification Search
USPC ........... 403/90, 408.1; 296/901.01, 181.2, 29; 411/531, 537
See application file for complete search history.

(56) References Cited

U.S. PATENT DOCUMENTS

| | | | | |
|---|---|---|---|---|
| 3,382,630 A | * | 5/1968 | Chivers | 52/208 |
| 5,542,777 A | * | 8/1996 | Johnson | 403/389 |
| 5,593,245 A | * | 1/1997 | Herz et al. | 403/403 |
| 5,820,191 A | * | 10/1998 | Blakewood et al. | 296/37.13 |
| 8,047,603 B2 | * | 11/2011 | Goral et al. | 296/187.03 |

* cited by examiner

*Primary Examiner* — Michael P Ferguson
*Assistant Examiner* — Daniel Wiley
(74) *Attorney, Agent, or Firm* — Quinn Law Group, PLLC

(57) ABSTRACT

An assembly includes a fiber-reinforced composite structure, a bushing, and a fastener. The composite structure includes a composite panel on a first side, where the composite panel defines a hemispherical well. The structure further includes a plurality of stiffening ribs on a second side, which are affixed to the composite panel. The composite panel defines a first bore at the center of the hemispherical well, which extends through the structure. The bushing has a hemispherical end and a flat end, and defines a second bore from the center of the hemispherical end to the center of the flat end. The hemispherical end of the bushing is configured to nest within the hemispherical well defined by the composite structure such that the flat end of the bushing is flush with the surrounding composite panel. The fastener is configured to extend within both of the first bore and the second bore.

15 Claims, 1 Drawing Sheet

HEMISPHERICAL JOINT FOR COMPOSITE MATERIAL JOINING

TECHNICAL FIELD

The present invention relates generally to fasteners for use with composite materials.

BACKGROUND

Composite materials are typically formed by suspending a high-tensile strength fibrous material within a solidified epoxy/resin matrix. Composite materials are favored in certain manufacturing settings for their high strength and light weight properties. In particular they are notably strong when the embedded fibers are placed in tension. When non-tensile forces are applied, however, the often-brittle epoxy/resin is prone to cracking at even low stresses. This brittle nature presents challenges when attempting to fasten the composite to a rigid structure, since the fastening load is typically a compressive load applied in a direction normal to the material.

SUMMARY

A joint assembly includes a fiber-reinforced composite structure, a bushing, and a fastener. The fiber-reinforced composite structure has a first side and a second side opposite the first side, and includes a composite panel disposed on the first side of the structure, and a plurality of stiffening ribs disposed on the second side of the structure and affixed to the composite panel. The composite panel defines a rounded well extending toward the second side of the composite structure, which has a a first radius of curvature. The composite panel further defines a first bore at the center of the rounded well, which extends through the composite structure.

The bushing generally has a rounded end and a flat end opposite the rounded end. The rounded end has a second radius of curvature, which may equal the first radius of curvature. The bushing defines a second bore centered within the rounded end and extending through the center of the flat end.

The rounded end of the bushing is configured to nest within the rounded well defined by the composite structure such that the flat end of the bushing is flush with the surrounding composite panel. The fastener is then configured to extend within both of the first bore and the second bore, and is configured to apply a compressive load against the flat end of the bushing.

In one configuration, each of the plurality of stiffening ribs are oriented such that they extend radially outward from the first bore. Likewise, an annular rib may be disposed about, and may partially define the first bore.

The fastener may include a body and a head, wherein the body is configured to extend within both the first bore and the second bore. Once installed, the head is configured to contact the flat surface of the bushing.

In one configuration, the flat end of the bushing defines a receiving portion configured to receive the head of the fastener such that an outward surface of the fastener is flush with the flat end of the bushing. In this manner, the head of the fastener may not excessively protrude from the flat end of the bushing.

The above features and advantages and other features and advantages of the present invention are readily apparent from the following detailed description of the best modes for carrying out the invention when taken in connection with the accompanying drawings.

DETAILED DESCRIPTION

Figure 1:
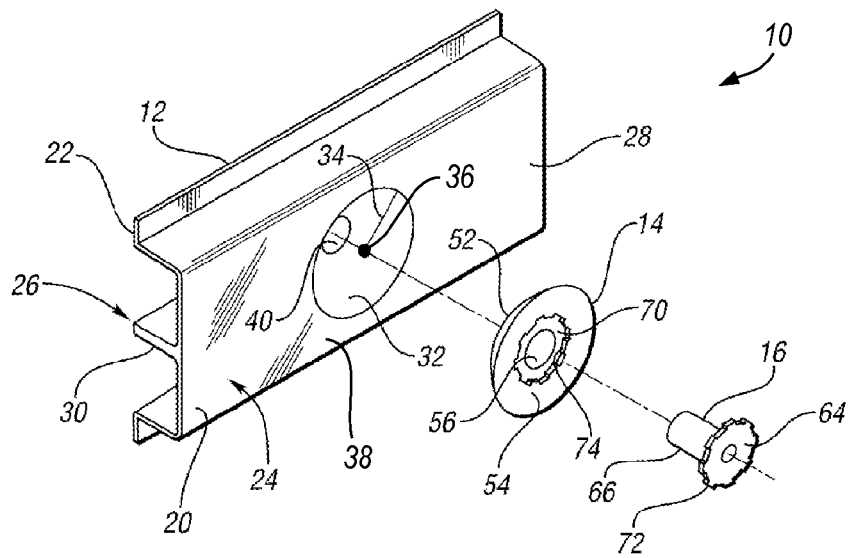
FIG. 1 is a schematic exploded perspective view of a spherical joint assembly for a composite material.

Referring to the drawings, wherein like reference numerals are used to identify like or identical components in the various views, FIG. 1 schematically illustrates an exploded perspective view of a joint assembly 10 for securing a composite structure 12 to a secondary member (not shown). In an automotive context, for example, the joint assembly may be useful in securing the composite structure 12 to a portion of the vehicle frame.

The joint assembly 10 may include the fiber-reinforced composite structure 12, a bushing 14, and a fastener 16 that may all cooperate to secure the composite structure 12 to a secondary element (not shown). The present design is intended to minimize stresses in the composite structure 12 that would otherwise exist immediately proximate to the fastener 16 when securing the composite structure 12, or during subsequent use.

The composite structure 12 may include a first side 20, and a second side 22 that is opposite the first side 20. The structure 12 may further include a panel portion 24 that may be disposed at or proximate to the first side 20, and a rib portion 26 that may be disposed at or proximate to the second side 22. The panel portion 24 may be defined by a composite panel 28 that has a generally constant outward facing surface. The rib portion 26 may include a plurality of stiffening ribs 30 that may be affixed to the composite panel 28, and may provide the panel 28 with an enhanced resistance to transverse bending.

One or both of the panel portion 24 and rib portion 26 may be formed from a fiber-reinforced composite material that may include a plurality of uni- or multi-directional fibers disposed within an epoxy or resinous matrix/substrate. For example, each rib 30 of the rib structure may include a plurality of fibers disposed lengthwise along the rib 30. In one configuration, the fibers may include spun glass fibers, carbon fibers, graphite fibers or other suitable high-tensile strength fiber materials. Each individual fiber may have a thickness/diameter of, for example approximately 5-10 µm. In other configurations, however, fibers having larger or smaller thicknesses may likewise be used.

The composite panel 28 may define a rounded well 32 extending toward the second side 22 of the composite structure 12. The rounded well 32 may have a generally uniform radius of curvature 34 that originates from a single center point 36. In one configuration, the center point 36 may lie on a plane defined by the outer surface 38 of the composite panel 28. As such, the rounded well 32 may approximate a hemisphere. In another configuration, the center point 36 may lie above the plane defined by the outer surface 38 of the composite panel 28. In this instance, the rounded well 32 may resemble a portion of a sphere.

The composite panel 28 may further define a bore 40 at the center of the rounded well 32. The bore 40 may extend through the entire composite structure 12 (i.e., from the first side 20 to the second side 22), and may be dimensioned to receive the fastener 16. In one embodiment, the rib portion 26 may cooperate with the composite panel 28 to define the bore 40. For example, an annular rib 42 may be disposed about, and may partially define the bore 40. Additionally, a plurality of stiffening ribs 44 may be configured to extend radially outward from the bore. Each rib 44 may be specifically positioned along a predetermined load path within the structure 12. Alternatively, each rib 44 may extend outward in a sunburst-type arrangement, or in some other concentric, radially-extending-type arrangement.

The bushing 14 may be configured to nest within the rounded well 32 defined by the composite structure 12. As used herein, the term "nest" is intended to mean that when the bushing 14 is inserted into the rounded well 32, a surface of the bushing makes surface contact (as opposed to point contact) with a surface defining the well 32. In this manner, the bushing may have a rounded end 52 and a flat end 54. The rounded end 52 may have a radius of curvature that is substantially equal to the radius of curvature 34 of the well 32. When inserted into the well, in one configuration, the flat end 54 of the bushing 14 may be substantially flush with the outer surface 38 of the composite panel 12.

The bushing 14 may define a second bore 56 that is centered within the rounded end 52 and extends through the center of the flat end 54. The second bore 56 may be positioned such that when the bushing 14 is inserted within the rounded well 32, the bore 56 of the bushing 14 may axially align with the bore 40 of the composite structure 12. Similar to the first bore 40, the second bore 56 may also be dimensioned to receive the fastener 16. When fully assembled, such as generally illustrated in the cross-sectional view 60 provided in FIG. 3, the fastener 16 may pass through each of the first bore 40 and the second bore 56, and a portion 62 of the fastener 16 may protrude from the second side 22 (i.e., the "protruding portion 62").

The fastener 16 may generally include a head portion 64 and a body portion 66. The body portion 66 may be dimensioned to extend within the first bore 40 and second bore 56, while the head portion 64 may be relatively wider than the body portion 66 (i.e., such that it may not pass through the second bore 56). When fully assembled, the head portion 64 of the fastener 16 may contact and may apply a compressive load to the flat end 54 of the bushing 14. This load may be sufficient to ensure continued contact between the round end 54 of the bushing 14 and the rounded well 32 of the composite structure 12. The compressive load may further aid in securing the composite structure to a secondary member that may ultimately be disposed about the protruding portion 62 of the fastener 16.

Figure 3:
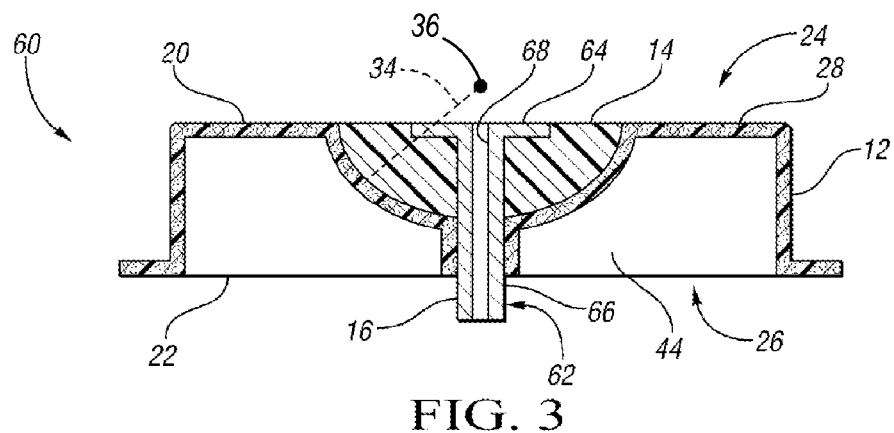
FIG. 3 is a schematic cross-sectional view of a spherical joint assembly for a composite material.

As generally illustrated in FIG. 3, in one configuration, the fastener 16 may be a rivet that further defines a central bore 68. As may be appreciated, to fasten the rivet to the secondary member, a portion of the protruding portion 62 may be radially deformed outward to prevent the rivet from withdrawing back through the first bore 40. In other configurations, the fastener may be, for example, a screw, bolt, or pin.

The flat end 54 of the bushing 14 may further define a receiving portion 70 portion that may be dimensioned to receive the head portion 64 of the fastener 16. Once assembled, a portion or the entire head portion 64 of the fastener 16 may be disposed in the receiving portion 70 and below the outward surface of the flat end 54 of the bushing 14. In one configuration, the receiving portion 70 may be dimensioned such that upon insertion of the fastener into the second bore 56, an outward surface of the head portion 64 of the fastener 16 would be flush with the surrounding surface of the flat end 54 of the bushing 14.

Figure 2:
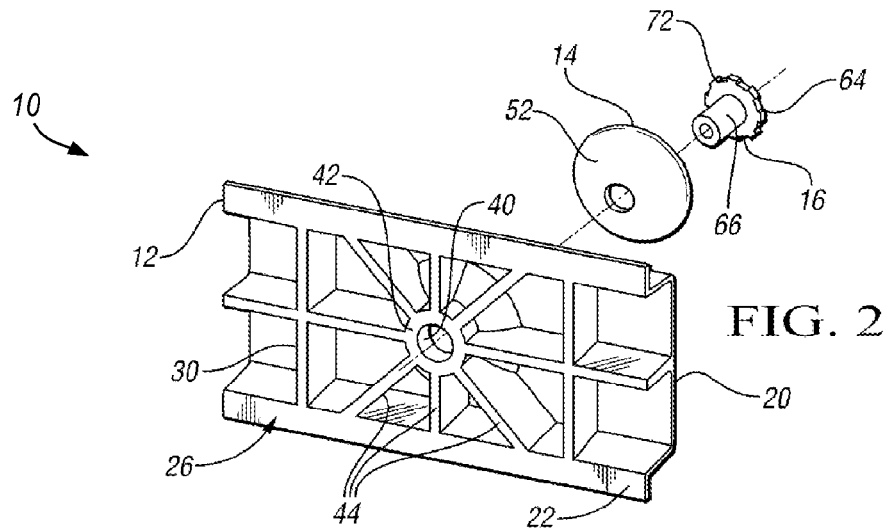
FIG. 2 is a reverse view of the schematic exploded perspective view shown in FIG. 1.

In one configuration, such as schematically shown in FIGS. 1 and 2, the head portion 64 of the fastener 16 may include a profiled (i.e., non-circular) outer perimeter 72. Example profiles may include square-tooth or saw-tooth projections around the outer perimeter, and/or oval, triangle, or square shaped outer perimeters. Likewise, an outer perimeter 74 of the receiving portion 70 may have an inverse profile of the fastener perimeter. In this manner, the fastener 16 may interlock with the bushing 14 upon assembly. This keyed nature may prevent rotation of the fastener 16 relative to the bushing 14 during assembly and use.

As mentioned above, the composite structure 12 may include a high tensile-strength fiber suspended within a hardened resin/epoxy. The fibers may be disposed within both the panel portion 24 and the rib portion 26, and may include both uni- and multi-directional fibers. In one configuration, the fastener 16 may be formed from either a high strength polymer, or a metal (e.g. aluminum or steel), and the bushing 14 may be formed from a polymeric material (e.g., a nylon material, a polyvinyl chloride (PVC) material, or a Polytetrafluoroethylene (PTFE) material). As such, the bushing may aid in electrically isolating the fastener from the composite structure, and may correspondingly resist the occurrence of a galvanic couple/corrosion between the fastener 16 and the fiber in the structure 12.

One benefit of using such a rounded bushing 14 is that any lateral loads that may be imparted to either the fastener or the composite structure during use would be transferred across a larger surface area than if the fastener was merely inserted through the composite alone. This increase in surface area will minimize any localized stresses, which would have otherwise occurred absent the bushing. A lower and more even stress distribution through the composite structure 12 may preserve the integrity of the resin/epoxy matrix and prolong the life of the composite.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An assembly comprising:
a fiber-reinforced composite structure having a first side and a second side opposite the first side, the fiber-reinforced composite structure including:
 a composite panel disposed on the first side of the structure, the composite panel defining a hemispherical well extending toward the second side of the composite structure;
 a plurality of stiffening ribs disposed on the second side of the structure and affixed to the composite panel;
 wherein the composite panel defines a first bore at the center of the hemispherical well, the first bore extending through the composite structure;
a bushing having a hemispherical end and a flat end opposite the hemispherical end, the bushing defining a second bore centered within the hemispherical end and extending through the center of the flat end;
wherein the hemispherical end of the bushing is configured to nest within the hemispherical well defined by the composite structure such that the flat end of the bushing is flush with the surrounding composite panel;
a fastener configured to extend within both of the first bore and the second bore, the fastener including a non-circular head and a body extending from the head, the body configured to extend within the first bore and the second bore, and the head configured to contact the flat surface of the bushing, and wherein the fastener is configured to apply a compressive load against the flat end of the bushing;

wherein the flat end of the bushing includes a receiving portion, the receiving portion including a non-circular outer profile that is configured to interlock with the head of the fastener to prevent rotation of the fastener relative to the bushing; and wherein a portion of the body of the fastener distal to the head is radially deformed outwardly to prevent the fastener from being withdrawn from the first bore.

2. The assembly of claim 1, wherein each of the plurality of stiffening ribs extend radially outward from the first bore.

3. The assembly of claim 2, further comprising an annular rib disposed about, and partially defining the first bore.

4. The assembly of claim 1, wherein the fastener is a rivet.

5. The assembly of claim 1, wherein the bushing is formed of a polymeric material.

6. The assembly of claim 1, wherein the fiber-reinforced composite includes a plurality of carbon fibers; and wherein a subset of the plurality of carbon fibers are disposed within the plurality of stiffening ribs.

7. The assembly of claim 1, wherein the hemispherical well has a first radius of curvature extending from a first center-point, the hemispherical end of the bushing has a second radius of curvature extending from a second center-point; and wherein the first radius of curvature is equal to the second radius of curvature.

8. The assembly of claim 7, wherein the first center-point is coincident with the second center-point when the bushing is nested within the hemispherical well.

9. An assembly comprising:

a fiber-reinforced composite structure having a first side and a second side opposite the first side, the fiber-reinforced composite structure including:

a composite panel disposed on the first side of the structure, the composite panel defining a concave well extending toward the second side of the composite structure, wherein the concave well has a first radius of curvature;

a plurality of stiffening ribs disposed on the second side of the structure and affixed to the composite panel;

wherein the composite panel defines a first bore at the center of the concave well, the first bore extending through the composite structure;

a bushing having a convex end and a flat end opposite the convex end, the bushing defining a second bore centered within the convex end and extending through the center of the flat end, and wherein the convex end has a second radius of curvature;

wherein the convex end of the bushing is configured to nest within the concave well defined by the composite structure such that the flat end of the bushing is flush with the surrounding composite panel;

a fastener configured to extend within both of the first bore and the second bore, the fastener including a non-circular head and a body extending from the head, the body configured to extend within the first bore and the second bore, and the head configured to contact the flat surface of the bushing, and wherein the fastener is configured to apply a compressive load against the flat end of the bushing;

wherein the first radius of curvature is equal to the second radius of curvature;

wherein the flat end of the bushing includes a receiving portion, the receiving portion including a non-circular outer profile that is configured to interlock with the head of the fastener to prevent rotation of the fastener relative to the bushing; and wherein a portion of the body of the fastener distal to the head is radially deformed outwardly to prevent the fastener from being withdrawn from the first bore.

10. The assembly of claim 9, wherein each of the plurality of stiffening ribs extend radially outward from the first bore.

11. The assembly of claim 10, further comprising an annular rib disposed about, and partially defining the first bore.

12. The assembly of claim 9, wherein the fastener is a rivet.

13. The assembly of claim 9, wherein the bushing is formed of a polymeric or metallic material.

14. The assembly of claim 9, wherein the fiber-reinforced composite includes a plurality of carbon fibers; and wherein a subset of the plurality of carbon fibers are disposed within the plurality of stiffening ribs.

15. The assembly of claim 9, wherein the first radius of curvature extends from a first center-point, the second radius of curvature extends from a second center-point, and wherein the first center-point is coincident with the second center-point when the bushing is nested within the concave well.

* * * * *